(12) United States Patent
Jung et al.

(10) Patent No.: US 8,953,539 B2
(45) Date of Patent: Feb. 10, 2015

(54) METHOD FOR UPDATING CARRIER INFORMATION IN A BROADBAND WIRELESS ACCESS SYSTEM

(75) Inventors: In Uk Jung, Anyang-si (KR); Young Soo Yuk, Anyang-si (KR); Eun Jong Lee, Anyang-si (KR); Ki Seon Ryu, Anyang-si (KR); Jin Sam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 33 days.

(21) Appl. No.: 13/581,273

(22) PCT Filed: Feb. 25, 2011

(86) PCT No.: PCT/KR2011/001366
§ 371 (c)(1),
(2), (4) Date: Sep. 13, 2012

(87) PCT Pub. No.: WO2011/105862
PCT Pub. Date: Sep. 1, 2011

(65) Prior Publication Data
US 2013/0010691 A1    Jan. 10, 2013

Related U.S. Application Data

(60) Provisional application No. 61/308,272, filed on Feb. 25, 2010.

(30) Foreign Application Priority Data

Feb. 25, 2011    (KR) ........................ 10-2011-0017008

(51) Int. Cl.
*H04W 4/00*    (2009.01)
*H04L 5/00*    (2006.01)
*H04W 72/04*    (2009.01)

(52) U.S. Cl.
CPC ........... *H04L 5/001* (2013.01); *H04W 72/0406* (2013.01); *H04L 5/0092* (2013.01); *H04L 5/0098* (2013.01); *H04W 72/0453* (2013.01)
USPC .......................................... 370/329; 370/328

(58) Field of Classification Search
CPC ............................. H04W 72/04; H04L 5/0007
See application file for complete search history.

(56) References Cited

U.S. PATENT DOCUMENTS 5,400,322 A * 3/1995 Hunt et al. .................... 370/468
(Continued)

FOREIGN PATENT DOCUMENTS

| JP | 2004-102893 | 4/2004 |
|---|---|---|
| JP | 2009-049993 | 3/2009 |
| WO | 2010/005233 | 1/2010 |

OTHER PUBLICATIONS

PCT International Application No. PCT/KR2011/001366, Written Opinion of the International Searching Authority dated Oct. 31, 2011, 16 pages.

*Primary Examiner* — Kibrom T Hailu
(74) *Attorney, Agent, or Firm* — Lee, Hong, Degerman, Kang & Waimey

(57) ABSTRACT

The present invention relates to a broadband wireless access system, and more particularly, to a method in which a terminal acquires and updates global carrier configuration information of base stations in a network, and to an apparatus for performing the method. According to one embodiment of the present invention, a method in which a terminal acquires carrier configuration information in a broadband wireless access system that supports multiple carriers comprises the following steps; transmitting a first message containing a change count value of the carrier configuration information acquired by the terminal: receiving, from the base station and in response to the first message, a second message containing the current change count value of the carrier configuration information; and, if the change count value of the first message and the change count value of the second message are different from each other, receiving a third message containing current carrier configuration information and the current change count value from the base station.

21 Claims, 5 Drawing Sheets

(56) References Cited

U.S. PATENT DOCUMENTS

| | | | |
|---|---|---|---|
| 8,660,557 B2* | 2/2014 | Kang et al. | 455/436 |
| 2005/0197126 A1* | 9/2005 | Kang et al. | 455/442 |
| 2005/0277417 A1* | 12/2005 | Yoon et al. | 455/436 |
| 2009/0316575 A1 | 12/2009 | Gholmieh et al. | |
| 2010/0027492 A1 | 2/2010 | Asanuma | |
| 2010/0067470 A1 | 3/2010 | Damnjanovic et al. | |
| 2010/0202392 A1 | 8/2010 | Zhang et al. | |
| 2010/0272051 A1* | 10/2010 | Fu et al. | 370/329 |

* cited by examiner (a)

(b)

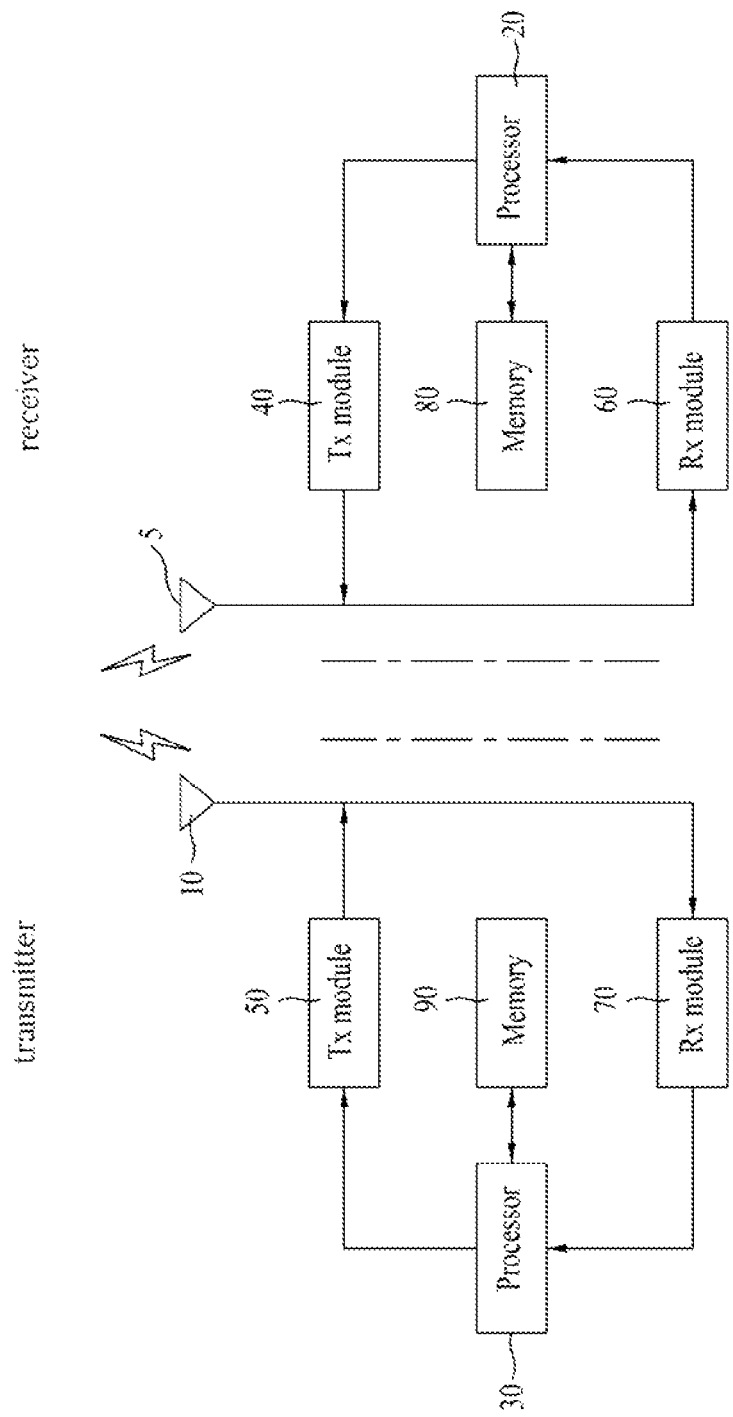

METHOD FOR UPDATING CARRIER INFORMATION IN A BROADBAND WIRELESS ACCESS SYSTEM

CROSS-REFERENCE TO RELATED APPLICATIONS

This application is the National Stage filing under 35 U.S.C. 371 of International Application No, PCT/KR2011/001366, filed on Feb. 25, 2011, which claims the benefit of earlier filing date and right of priority to Korean Patent Application No, 10-2011-0017008, filed on Feb. 25, 2011, and also claims the benefit of U.S. Provisional Application Ser. No. 61/308,272, filed on Feb. 25, 2010, the contents of which are all hereby incorporated by reference herein in their entirety.

TECHNICAL FIELD

The present invention relates to a broadband wireless access system, and more particularly, to a method for a mobile station to acquire and update global carrier configuration information of base stations in a network and apparatus therefor.

BACKGROUND ART

In the following description, carriers are schematically explained.

First of all, a user is able to provide information to transmit by modulating and manipulating an amplitude, frequency and/or phase of a sinusoidal wave or a periodic pulse wave. In this case, the sinusoidal or periodic pulse wave playing a role in carrying the information is called a carrier.

Carrier modulation schemes may be classified into a single-carrier modulation (SCM) scheme and a multicarrier modulation (MCM) scheme. In particular, the single-carrier modulation (SCM) scheme is a modulation scheme of having all information carried on a single carrier.

According to the multicarrier modulation (MCM) scheme, a whole bandwidth channel of a single carrier is divided into a plurality of subchannels having small bandwidths and a plurality of narrowband subcarriers are transmitted on the subchannels by multiplexing.

In doing so, if the multicarrier modulation (MCM) scheme is used, a plurality of the subchannels may be approximated to a flat channel owing to their small bandwidths. And, a user may be able to compensate for channel distortion using a simple equalizer. Moreover, the multicarrier modulation (MCM) scheme enables fast implementation using Fast Fourier Transform (FFT). In particular, the multicarrier modulation (MCM) scheme is superior to the single-carrier modulation (SCM) scheme in aspect of fast data transmission.

As the performance of a base station and/or a mobile station is being increasingly enhanced, a frequency bandwidth providable or available for the base station and/or the mobile station is extending increasingly. Hence, according to embodiments of the present invention, a multicarrier system supportive of a broadband in a manner of aggregating at least one or more carriers together is disclosed.

In particular, a multicarrier system mentioned in the following description corresponds to a case of aggregating at least one or more carriers to use, which is different from the multicarrier modulation (MCM) scheme of viding a single carrier to use.

In order to efficiently use multi-band or multicarrier, a scheme for a single medium access control (MAC) entity to manage several carriers (e.g., several frequency carriers (FCs)) has been proposed.

FIG. 1($a$) and FIG. 1($b$) are diagrams to describe a multi-band radio frequency (RF) based signal transceiving method.

Referring to FIG. 1, a medium access control (MAC) layer in a transmitting/receiver may be able to manage a plurality of carriers to efficiently use multiple carriers. In doing so, in order to effectively transceive multiple carriers, assume that both of the transmitter and the receiver are capable of transceiving the multiple carriers. In this case, since it is unnecessary for frequency carriers (FCs) managed by the MAC layer to be contiguous with each other, it is flexible in aspect of resource management. In particular, both contiguous carrier aggregation and non-contiguous carrier aggregation are possible.

Referring to FIG. 1($a$) and FIG. 1($b$), physical layers PHY 0 to PHY n−1 indicate multiple bands of the present invention, respectively. Each of the multiple bands may have a frequency carrier (FC) size assigned to a specific service by a previously determined frequency policy. For instance, PHY 0 (RF carrier 0) may have a size of a frequency band assigned for a normal FM radio broadcast and PHY 1 (RF carrier 1) may have a size of a frequency band assigned for a mobile phone communication.

Thus, the respective frequency bands may differ from each other in frequency band size in accordance with frequency band properties, respectively. For clarity, in the following description, assume that each frequency carrier (FC) has a size of A MHz. And, each of the frequency assignment brands may be represented as a carrier frequency to use a baseband signal on a corresponding frequency band. In the following description, each frequency assignment band shall be named a carrier frequency band. If here is no confusion, each carrier frequency band shall be simply named a carrier. Moreover, as recently defined in 3GPP LTE-A, the above-mentioned carrier may be called a component carrier to be discriminated from a subcarrier used by a multicarrier system.

In this aspect, the multi-band scheme may be called a multicarrier scheme or a carrier aggregation scheme.

FIG. 2 a diagram for one example of illustrating how multiple carriers are used in a general wireless communication system.

Referring to FIG. 2, a multicarrier in a general technology may include contiguous carrier aggregation [FIG. 2($a$)] or non-contiguous carrier aggregation [FIG. 2($b$)]. In this case, a unit of the carrier aggregation is a basic bandwidth unit of a general legacy system (e.g., LTE in case of LTE-A (long term evolution-advanced) system, IEEE 802.16e in case of IEEE 802.16m system). In a multicarrier configuration of a general technology, carriers of two types are defined as follows.

First of all, a $1^{st}$ carrier (or, a primary carrier) means a carrier means a carrier for exchanging traffics and full PHY/MAC control informations between a mobile station and a base station. And, the primary carrier may be usable for such a general operation of a mobile station as a network entry and the like. Moreover, each mobile station has one primary carrier in one cell.

Secondly, a $2^{nd}$ carrier (or, a secondary carrier) generally means a supplementary carrier usable for an exchange of traffics in accordance with a UE-specific assignment command and rule received on the $1^{st}$ carrier. The $2^{nd}$ carrier may include control signaling to support a multicarrier operation. Generally, all control informations and information on a secondary information are received via a primary carrier and data is transmitted and received on the secondary carrier.

General technology may be able to categorize carriers of a multicarrier system into a fully configured carrier and a partially configured carrier based on the above-described primary and secondary carriers.

First of all, the fully configured carrier may indicate the carrier for configuring all control signals including synchronization, broadcast, multicast and unicast control channels. Moreover, informations and parameters for carriers different from those of the multicarrier operation may be included in the control channels.

Secondly, the partially configured carrier may mean the carrier for configuring all control channels to support a DL transmission in a DL carrier having no UL carrier to pair in a TDD (time division duplex) DL transmission or FDD (frequency division duplex) mode. A secondary carrier, which is a fully configured carrier configured in a prescribed mobile station may be allocated as a primary carrier of another mobile station.

Generally, a mobile station performs an initial network entry via a primary carrier and may be able to exchange information on mutual multicarrier capability in a registration procedure via registration request/response (AAI_REG-REQ/RSP) exchange with a base station.

There are various kinds of methods for obtaining multicarrier configuration information of a specific base station. For example, MC information of a specific base station is broadcasted or may be transmitted by unicast per mobile station. For another example, carriers used by base stations within a corresponding network are categorized by groups, MC informations of groups are entirely provided to a mobile station, and a group combination of the MC informations applied to the corresponding base station is notified to the corresponding mobile station.

In case that the information on the multicarrier configuration is transmitted in a manner of the latter case, the corresponding information contains the informations of a plurality of MC groups entirely. However, it is inefficient for a mobile station to receive the information on the multicarrier configuration each time performing a network reentry.

DISCLOSURE OF THE INVENTION

Technical Task

Accordingly, the present invention is directed to substantially obviate one or more problems due to limitations and disadvantages of the related art. First of all, an object of the present invention is to provide a method for a mobile station to efficiently obtain broadband carrier configuration information from a base station in a multicarrier environment.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, a method of obtaining carrier configuration information, which is obtained by a mobile station in a multicarrier supportive broadband wireless access system, according to one embodiment of the present invention may include the steps of sending a $1^{st}$ message containing a change count value of the carrier configuration information retained by the mobile station to a base station, receiving a $2^{nd}$ message containing a current change count value of the carrier configuration information from the base station in response to the $1^{st}$ message, and if the change count value of the $1^{st}$ message and the current change count value of the $2^{nd}$ message are different from each other, receiving a $3^{rd}$ message containing a current carrier configuration information and the current change count value from the base station.

Preferably, the change count value of the $1^{st}$ message may include a change count value of the $3^{rd}$ message recently received by the mobile station or a preset value indicating that the mobile station did not receive the $3^{rd}$ message previously.

Preferably, if the change count value of the $1^{st}$ message and the current change count value of the $2^{nd}$ message are different from each other, the mobile station does not perform a multicarrier related operation until receiving the $3^{rd}$ message.

To further achieve these and other advantages and in accordance with the purpose of the present invention, a method of transmitting carrier configuration information, which is transmitted to a mobile station by a base station in a multicarrier supportive broadband wireless access system, according to one embodiment of the present invention may include the steps of receiving a $1^{st}$ message containing a change count value of the carrier configuration information retained by the mobile station from the mobile station, comparing the change count value of the $1^{st}$ message and a current change count value of the carrier configuration information with each other, if the change count value of the $1^{st}$ message and the current change count value of the carrier configuration information are different from each other as a result of the comparing step, sending a $2^{nd}$ message containing the current change count value to the mobile station in response to the $1^{st}$ message, and transmitting a $3^{rd}$ message containing a current carrier configuration information and the current change count value to the mobile station.

Preferably, the change count value of the $1^{st}$ message may include a change count value of the $3^{rd}$ message recently received by the mobile station or a preset value indicating that the mobile station did not receive the $3^{rd}$ message previously.

Preferably, if the change count value of the $1^{st}$ message and the change count value of the $2^{nd}$ message are different from each other, the mobile station does not perform a multicarrier related operation until receiving the $3^{rd}$ message.

To further achieve these and other advantages and in accordance with the purpose of the present invention, a mobile station, which operates in a multicarrier supportive broadband wireless access system, according to another embodiment of the present invention may include a processor and an RF (radio frequency) module configured to transceiver radio signals externally under a control of the processor, the processor controlling the RF module to send a $1^{st}$ message containing a change count value of the carrier configuration information retained by the mobile station to a base station, the processor controlling the RF module to receive a $2^{nd}$ message containing a current change count value of the carrier configuration information from the base station in response to the $1^{st}$ message, the processor, if the change count value of the $1^{st}$ message and the change count value of the $2^{nd}$ message are different from each other, controlling a current carrier configuration information and the current change count value to be obtained via a $3^{rd}$ message received from the base station.

Preferably, the change count value of the $1^{st}$ message may include a change count value of the $3^{rd}$ message recently received by the mobile station or a preset value indicating that the mobile station did not receive the $3^{rd}$ message previously.

Preferably, if the change count value of the $1^{st}$ message and the change count value of the $2^{nd}$ message are different from each other, the processor controls a multicarrier related operation not to be performed until receiving the $3^{rd}$ message.

Preferably, according to the above-mentioned embodiments, the carrier configuration information may include configuration information of at least one carrier group globally applied to a network having the base station belong thereto.

Preferably, according to the above-mentioned embodiments, the $1^{st}$ message may include a registration request (AAI_REG-REQ) message, the $2^{nd}$ message may include a registration response (AAI_REG-RSP) message, the $3^{rd}$ message may include a global carrier configuration (AAI_Global-CFG) message, and the change count may include a global carrier configuration change count.

Advantageous Effects

Accordingly, the present invention may provide the following effects and/or features.

First of all, using embodiments of the present invention, a mobile station is able to efficiently obtain broadband carrier configuration information from a base station.

Secondly, a mobile station is able to know whether carrier configuration information contained by it is the latest through embodiments of the present invention, thereby preventing a multicarrier related operation from being performed using non-updated carrier configuration information.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 5 is a block diagram for one example of structures of transmitter and receiver according to another embodiment of the present invention.

MODE FOR INVENTION

Figure 1:
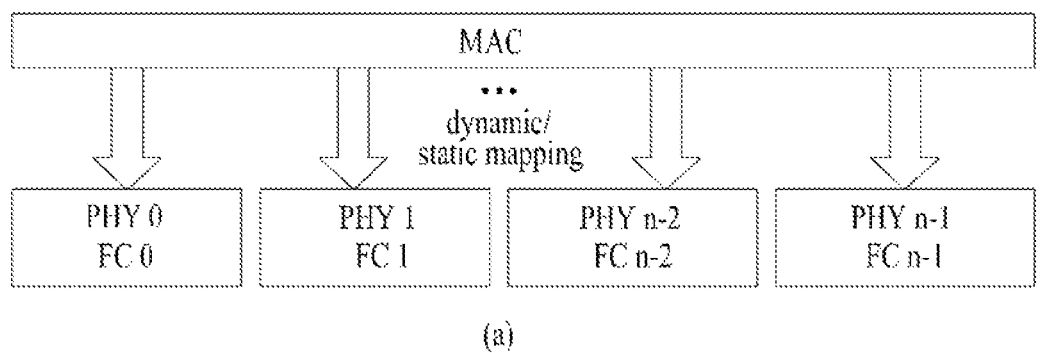
FIG. 1(a) and FIG. 1(b) are diagrams to describe a multiband radio frequency (RF) based signal transceiving method.
Figure 1:
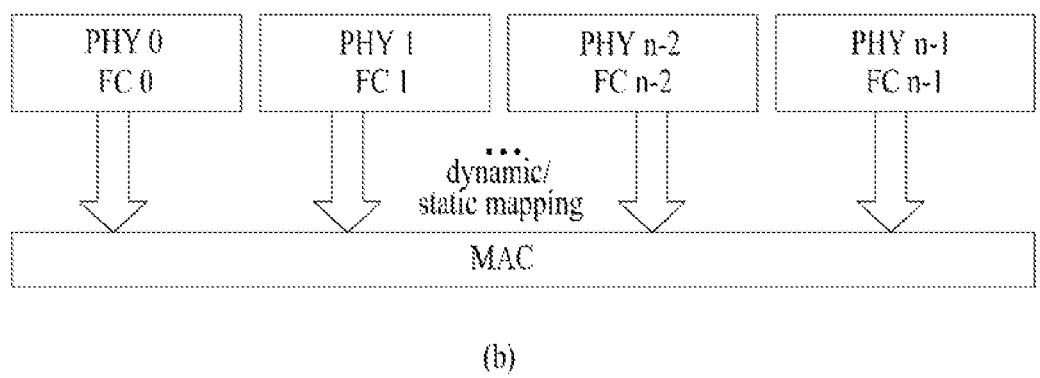
Figure 2:
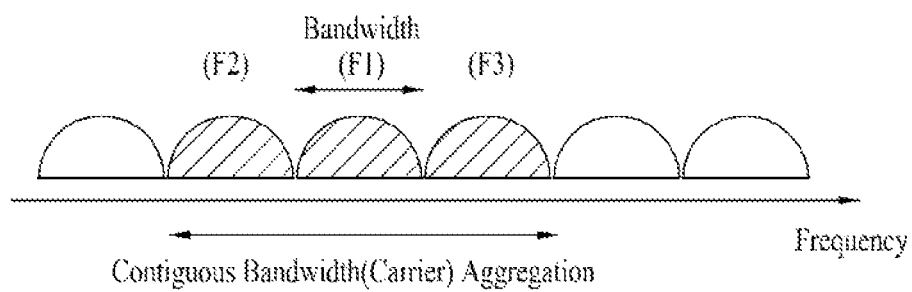
FIG. 2 a diagram for one example of illustrating how multiple carriers are used in a general wireless communication system.
Figure 2:
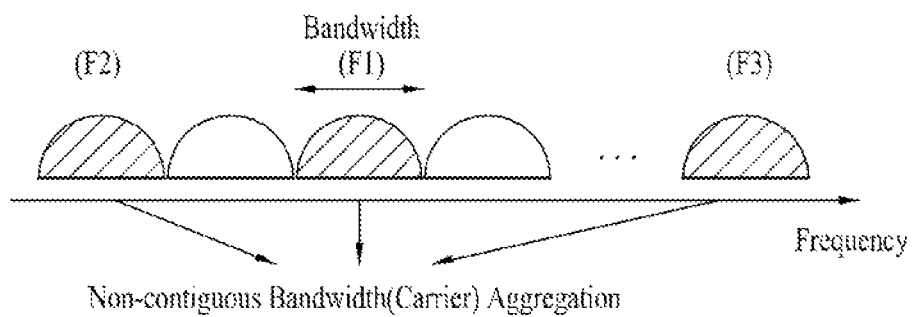

The present invention relates to a wireless access system. In the following description, methods of updating multicarrier information efficiently according to embodiments of the present invention are described.

First of all, the following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In the description of drawings, procedures or steps, which may ruin the substance of the present invention, are not explained. And, procedures or steps, which can be understood by those skilled in the art, are not explained as well.

In this specification, embodiments of the present invention are described centering on the data transmission/reception relations between a base station and a terminal. In this case, the base station is meaningful as a terminal node of a network which directly performs communication with the terminal. In this disclosure, a specific operation explained as performed by a base station can be occasionally performed by an upper node of the base station.

In particular, in a network constructed with a plurality of network nodes including a base station, it is apparent that various operations performed for communication with a terminal can be performed by a base station or other networks except the base station. In this case, 'base station' can be replaced by such a terminology as a fixed station, a Node B, an eNode B (eNB), an advanced base station (ABS), an access point, an advanced base station (ABS) and the like. And, 'mobile station (MS)' can be replaced by such a terminology as a user equipment (UE), a subscriber station (SS), a mobile subscriber station (MSS), an advanced mobile station (AMS), a mobile terminal and the like.

Moreover, a transmitter means a node that transmits a data service or a speech service. And, a receiver means a node that receives a data service or a speech service. Hence, a mobile station can become a transmitter and a base station can become a receiver, in uplink. Likewise, a mobile station becomes a receiver and a base station becomes a transmitter, in downlink.

Meanwhile, a mobile terminal of the present invention may include one of a PDA (personal digital assistant (PDA), a cellular phone, a PCS (personal communication service) phone, a GSM (global system for mobile) phone, a WCDMA (wideband CDMA) phone, an MBS (mobile broadband system) phone and the like.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the means well-known to the public.

Embodiments of the present invention are supportable by standard documents disclosed in at least one of wireless access systems including IEEE 802 system, 3GPP system, 3GPP LTE system and 3GPP2 system. In particular, the steps or parts, which are not explained to clearly reveal the technical idea of the present invention, in the embodiments of the present invention can be supported by the above documents. In particular, embodiments of the present invention may be supported by at least one of P802.16-2004, P802.16e-2005, P802.16Rev2 and P802.16m documents which are the standards of IEEE 802.16 system.

In the following description, specific terminologies used for embodiments of the present invention are provided to help the understanding of the present invention. And, the use of the specific terminology can be modified into another form within the scope of the technical idea of the present invention.

The present specification is described on the assumption of IEEE 802.16 system. In particular, a mobile station mentioned in the following description may be assumed as an AMS (advanced mobile station) that satisfies the standards defined by IEEE 802.16m. And, a base station is assumed as an ABS (advanced base station) that satisfies the same standards.

Terminologies usable for a multicarrier operation are defined as follows.

1. Available carriers mean all carriers belonging to a base station (e.g., ABS). A mobile station may be able to obtain information on the available carrier via a global carrier configuration (AAI_Global-config) message or a multicarrier advertisement (AAI_MC-ADV) message.

2. Assigned carriers mean a subset of available carriers assigned to a mobile station by a base station in accordance with capability of the mobile station. In particular, in consideration of the capability of the mobile station, the base station may be able to assign at least one of its available carriers as an assigned secondary carrier of the mobile station.

3. Active carrier means a carrier ready to actually exchange data between a mobile station and a base station and may include a subset of assigned carriers. Activation or deactivation of the assigned secondary carrier may be determined by a determination of the base station based on a QoS (quality of service) request. The base station may be able to inform the mobile station of a presence or non-presence of activation/deactivation of a specific secondary carrier via a carrier management command (AAI_CM-CMD) message.

Based on the above-mentioned definitions, a procedure for a base station to assign a carrier to a mobile station is described with reference to FIG. 3 as follows.

Figure 3:
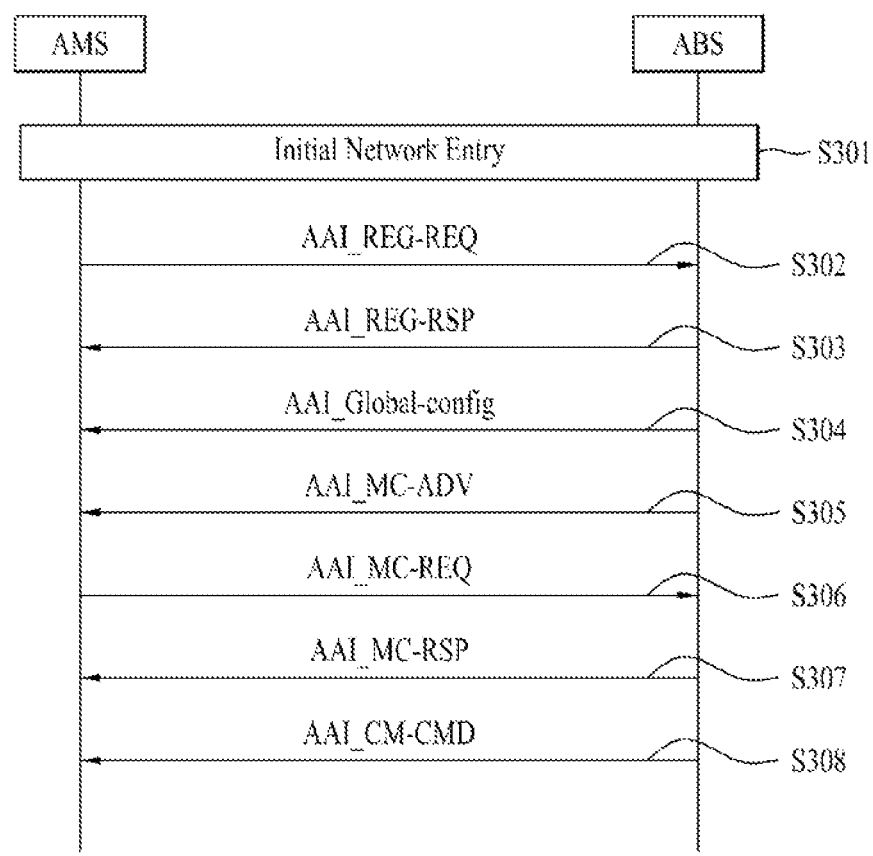
FIG. 3 is a diagram for one example of a procedure for a base station to assign at least one carrier to a mobile station in a broadband wireless access system.

FIG. 3 is a diagram for one example of a procedure for a base station to assign at least one carrier to a mobile station in a broadband wireless access system.

Referring to FIG. 3, an Advanced Mobile Station (AMS) performs an initial access procedure (e.g., an initial network entry) including a scanning step, a ranging step and the like on a base station (ABS) [S301].

The mobile station and the base station may be able to exchange information on mutual multicarrier capabilities via registration request/response (AAI_REG-REQ/RSP) messages [S302, S303].

Having sent the AAI-REG-RSP message to the mobile station, the base station may be able to send a global carrier configuration (AAI_Global-CFG) message [S304].

In this case, the global carrier configuration message may contain information on all available carriers supported by a network.

The mobile station receives a multicarrier advertisement (AAI_MC-ADV) message periodically broadcasted by the base station and may be then able to obtain the information on a multicarrier configuration of the base station [S305].

Subsequently, using the obtained information, the mobile station may be able to make a request for a list of assigned carrier to the base station in a manner of informing the base station of information on carriers (i.e., AMS's supportable carriers) supportable by the mobile station in accordance with the multicarrier configurations of the available carriers of the base station via a multicarrier request (AAI_MC-REQ) message [S306].

Based on the information received from the mobile station, the base station determines an assigned carrier list by determining a subset to assign secondary carriers of the mobile station in its available carriers and may be then able to inform the mobile station of the determined assigned carrier list via a multicarrier response (AAI_MC-RSP) message [S307].

Thereafter, the base station may be able to inform the mobile station of a presence or non-presence of activation/deactivation of the assigned carrier having been assigned to the mobile station in accordance with the determination on the basis of a QoS (quality of service) request in a manner of sending a carrier management command (AAI_CM-CMD) message to the mobile station [S308].

As mentioned in the forgoing description, multicarrier configuration (MC) information on all available carriers supported by the network in contained in the global carrier configuration message.

The multicarrier configuration (MC) information contained in the global carrier configuration message may include a field for the number of carrier group[s indicating the number of groups, in each of which carriers configured with subcarriers are aligned with a prescribed frequency offset, information on each of the groups, carrier information in the corresponding group and the like. The group information may include a multiplexing mode, the number of carriers, a multicarrier configuration index and the like. And, the carrier information may include a center frequency, a physical carrier index, a carrier type, a start frequency information and the like. Yet, this multicarrier configuration information of the network corresponds to a system information which is very static.

Thus, if the mobile station receives the multicarrier configuration information from the corresponding base station each time performing a network entry/reentry, it may cause a problem of inefficiency. In order to solve this problem, according to the present invention, in a registration step of a network entry/reentry procedure, i.e., in AAI_REG-REQ/RSP message exchanging step, a mobile station informs a base station of a global carrier configuration information retained by the mobile station. If the global carrier configuration information is not valid (i.e., if an update is necessary), the base station is proposed to send a global carrier configuration message to the mobile station. Moreover, according to the present invention, a global carrier configuration change count is proposed to be used as a method of determining whether to update the global carrier configuration information.

A global carrier configuration change count of the present invention may be incremented by 1 each time a global carrier configuration information is changed. And, the global carrier configuration change count is contained in a global carrier configuration message to indicate whether the global carrier configuration information contained in the corresponding message is changed. Moreover, since the global carrier configuration change count is contained in a registration request message, a base station may be able to determine whether the global carrier configuration information retained by the mobile station is the latest. On the other hand, the global carrier configuration change count is contained in a registration response message to inform the mobile station whether a current global carrier configuration information has been changed.

In the following description, a method of obtaining/updating global carrier configuration information using the above-described global carrier configuration change count is explained with reference to FIG. 4.

Figure 4:
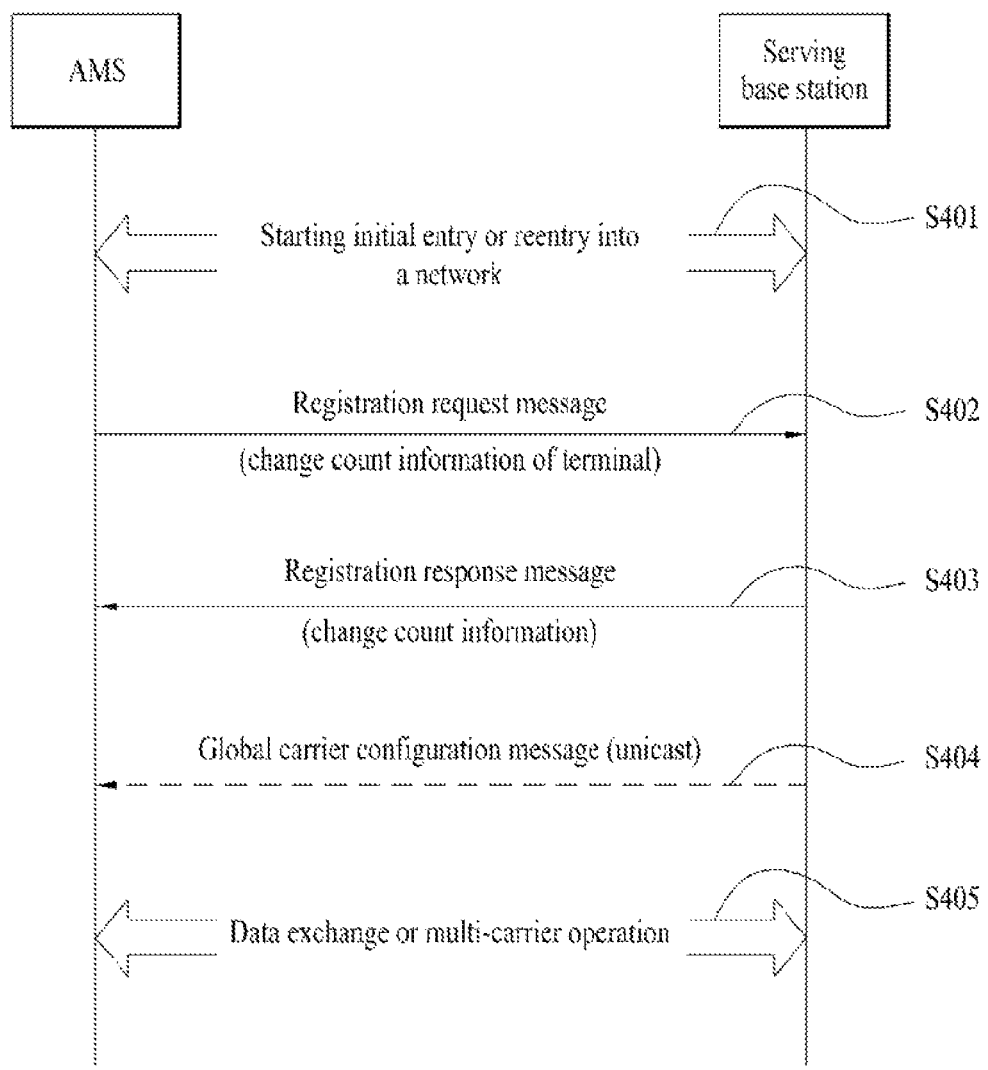
FIG. 4 is a diagram for one example of a procedure for updating global carrier configuration information via a global carrier configuration message according to the present invention.

FIG. 4 is a diagram for one example of a procedure for updating global carrier configuration information via a global carrier configuration message according to the present invention.

Referring to FIG. 4, a mobile station initiates an initial network entry or reentry such as a scanning, a ranging and the like into a base station [S401].

In order to perform a registration procedure, the mobile station sends a registration request (AAI_REG-REQ) message to the base station [S402]. In this case, the registration request message may contain a global carrier configuration change count information retained by the mobile station, i.e., a global carrier configuration change count information of a last received global carrier configuration message lately received by the mobile station.

In case that the mobile station performs the initial network entry, since there will be no global carrier configuration change count information previously obtained, a change count value may be set to a specific value (e.g., 0) set previously. In this case, it may be preferable that the specific value is not used as a global carrier configuration change count value of a global carrier configuration (AAI_Global-CFG) message. For instance, if a change count field is configured with 3 bits, a value of the field may be set to a value ranging between 0 and 7. In this case, if the specific value is set to 0, a change count field of the AAI_REG-RSP or AAI_Global-CFG message may be set to a value ranging between 1 and 7 depending on a presence or non-presence of change.

Moreover, in case that a mobile station has not received a global carrier configuration message at all, it may be able to use a method of omitting a global carrier configuration change count field from a registration request message. Moreover, it may be able to use a 1-bit information in a registration request message, e.g., an indication flag field, an indication bit filed and the lie to indicate whether a global carrier configuration message was previously received.

Table 1 shows one example of a portion of a format of a registration request message containing a global carrier configuration change count value.

TABLE 1

| name | | value |
|---|---|---|
| ... | | ... |
| Host configuration capabilities and parameters | Host configuration capability indicator information element (IE) | This field indicates whether a mobile station supports host configuration using parameters received via a registration response message. If a requested host configuration IE is contained in this message, this field is omitted. |
| | Requested host configuration IE | A requested host configuration option is contained in DHCP option format. If contained, this information element supports a host configuration by a mobile station using a registration response message and indicates that a host configuration capability indicator IE is omitted. |

TABLE 1-continued

| name | value |
|---|---|
| Global carrier configuration change count (3 bits) | This field indicates a global carrier configuration change count value last received by a mobile station in a network. If set to 0, this field indicates that the mobile station has never received global carrier configuration information. |
| ... | |

The base station compares a global carrier configuration change count value of the registration request message received from the mobile station to a current global carrier configuration change count value. If there is a difference between the values compared to each other (i.e., the global carrier configuration information of the mobile station is not valid), the base station has the current global carrier configuration change count value contained in a registration response message and then sends the registration response message to the mobile station [S403]. In doing so, instead of having the current global carrier configuration change count value contained in the registration response message, the base station may have a mismatch indicator contained in the registration response message to indicate that the global carrier configuration change count value is different/invalid.

Table 2 shows one example of a portion of a format of a registration response message containing a global carrier configuration change count value.

TABLE 2

| name | | Value |
|---|---|---|
| ... | | ... |
| Host configuration capabilities and its parameters | IPv4-Host-Adress IE | IPv4 host address assigned to UE |
| | IPv6-Home-Network-Prefix IE | IPv6 host network prefix assigned to UE |
| | Additional-Host-Configurations IE | Additional host configuration option of DHCP option format contained |
| Redirection Info | ABSID, preamble index and center frequency for one or more neighbor ABS | Transmitted for cell reselection in serving base station in case of occurrence of an event for the serving base station not to grant an entry of a mobile station |
| Global carrier configuration change count [3 bits] | Indicating a current value of a global carrier configuration change count of a network | |

If the global carrier configuration change count value retained by the mobile station is different from the current value, the base station sends a global carrier configuration message containing the latest global carrier configuration information by unicast to the mobile station [S404].

Table 3 shows one example of a global carrier configuration (AAI_Global-CFG) message format containing a global carrier configuration change count value.

TABLE 3

| field | Size (bits) | Description |
| --- | --- | --- |
| MAC Control Message Type | 8 | |
| Global carrier configuration change count | 3 | This field indicates a value of a global carrier configuration change count of a network. |
| Number of Carrier Groups | 4 | This field indicates the number of groups of contiguous carriers |
| ... | ... | ... |

In this case, the base station may be able to set a polling bit of a MAC control extension header (MCEH) of a medium access control protocol data unit (MAC PDU) containing the global carrier configuration message. In this case, the base station may be able to inform the base station whether the global carrier configuration message is successfully received using a message acknowledgement (AAI_MSG-ACK) message [not shown in the drawing]. If the base station fails to receive the message acknowledgment message from the mobile station until the expiration of an ACK timer corresponding to a time expectedly taken to receive the message ACK message, the base station sends the global carrier configuration message to the mobile station again.

Having received the global carrier configuration message successfully, the mobile station performs a general data exchange with the base station or may be able to perform a multicarrier related operation that requires the global carrier configuration information contained in the global carrier configuration message.

If the global carrier configuration change count value contained in the registration response message is different from the global carrier configuration change count value of the mobile station, it may be preferable for the mobile station not to perform the global carrier configuration information required operation (e.g., multicarrier assignment request using AAI_MC-REQ message, etc.) until the global carrier configuration message is normally received from the base station.

Structures of Mobile station And Base Station

In the following description, a mobile station and a base station (FBS, MBS), to which the above-described embodiments of the present invention are applicable, according to another embodiment of the present invention are explained.

First of all, a mobile station works as a transmitter in uplink and is able to work as a receiver in downlink. A base station works as a receiver in uplink and is able to work as a transmitter in downlink. In particular, each of the mobile station and the base station includes a transmitter and a receiver for transmission of information and/or data.

Each of the transmitter and the receiver can include a processor, a module, a part and/pr a means for performing embodiments of the present invention. In particular, each of the transmitter and the receiver can include a module (means) for encrypting a message, a module for interpreting the encrypted message, an antenna for transceiving the message and the like. Examples of the transmitter and receiver are described with reference to FIG. 5 as follows.

FIG. 5 is a block diagram for one example of structures of transmitter and receiver according to another embodiment of the present invention.

Referring to FIG. 5, a left part of the drawing shows a structure of a transmitter and a right part of the drawing shows a structure of a receiver. The transmitting/receiver may include an antenna 5/10, a processor 20/30, a transmitting (Tx) module 40/50, a receiving (Rx) module 60/70 and a memory 80/90. And, the respective components may be able to perform functions corresponding to each other. The respective components are described in detail as follows.

The antenna 5/10 performs a function of externally transmitting a signal generated from the transmitting module 40/50 or a function of receiving a radio signal from outside and then delivering the received radio signal to the receiving module 60/70. In case that a multiple-antenna (MIMO) function is supported, at least two antennas can be provided to the mobile station or the base station.

The antenna, the transmitting module and the receiving module may be integrated into a radio frequency (RF) module.

The processor 20/30 generally controls overall operations of a mobile/base station. In particular, the processor 20/30 is able to perform a control function for performing the above-described embodiments of the present invention, a MAC (medium access control) frame variable control function according to service characteristics and propagation environment, a handover function, an authentication function, an encryption function and the like. In more particular, the processor 20/30 can further perform overall controls for the carrier configuration information obtaining/updating procedure.

Especially, the processor of the mobile station may be able to determine whether the global carrier configuration information retained by the mobile station is valid in the base station through a registration request/response message exchange in the course of an initial network entry/reentry. The determination of the validation may be performed in a manner of comparison of a global carrier configuration change count value of the registration request/response message.

If the global carrier configuration information is not valid, the mobile station is able to receive a global carrier configuration message by unicast from the base station. If MAC PDU for carrying the corresponding message is accompanied by MCEH having a polling bit set to 1, the mobile station may be able to inform the base station whether the global carrier configuration message is successfully received using AAI_MSG-ACK message.

In case that the base station performs an initial network entry, since there is no AAI_Global-CFG message previously received, the mobile station may be able to send a registration request message in a manner of setting a global carrier configuration change count to a predefined value (e.g., 0) in the registration request message.

Besides, the processor of the mobile station may be able to perform overall control operations of the operating process disclosed in the above-mentioned embodiments.

The transmitting module 40/50 performs prescribed coding and modulation on a data, which is scheduled by the processor and will be then transmitted externally, and is then able to deliver the coded and modulated data to the antenna 50/10.

The receiving module 60/70 reconstructs the radio signal received externally via the antenna 1000/1010 into original data in a manner of performing decoding and demodulation on the radio signal received via the antenna 5/10 and is then able to deliver the reconstructed original data to the processor 20/30.

The memory 80/90 can store programs for processing and control of the processor 20/30 and is able to perform a function of temporarily storing input/output data. And, the memory 80/90 can include at least one of storage media including a flash memory, a hard disk, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

Meanwhile, the base station may perform a controller function for performing the above-described embodiments of the present invention, an OFDMA (orthogonal frequency division multiple access) packet scheduling, TDD (time division duplex) packet scheduling and channel multiplexing function, a MAC (medium access control) frame variable control function according to a service characteristic and electric wave environment, a fast traffic real-time control function, a handover function, an authentication and encryption function, a packet modulation/demodulation function for data transmission, a fast packet channel coding function, a real-time modem control function, and the like using at least one of the modules mentioned in the foregoing description and may further include means, modules, parts and/or the like to perform these functions.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Accordingly, a more efficient broadband carrier configuration information obtaining/updating procedure in a broadband wireless access system and a device structure for the same are mainly described by taking one example applied to IEEE 802.16m system and may be further applicable to various kinds of mobile communication systems including 3GPP/3GPP2 and the like as well as IEEE 802.xx system.

What is claimed is:

1. A method of receiving carrier configuration information by a mobile station in a network supporting Multi-carrier, the method comprising:
transmitting, by the mobile station to a base station, a first message, the first message being a registration request (AAI-REG-REQ) message including a latest received value of a carrier configuration change count of the network, the value of the carrier configuration change count being a value which is changed according to a change of carrier information for all available carriers in the network;
receiving, by the mobile station from the base station, a second message in response to the first message, the second message being a registration response (AAI-REG-RSP) message including a current value of the carrier configuration change count of the network; and
when the latest received value of the carrier configuration change count is invalid based on a comparison between the latest received value of a carrier configuration change count and the current value of the carrier configuration count by the base station, receiving, by the mobile station from the base station, a third message, the third message being a global carrier configuration (AAI-Global-CFG) including current carrier configuration information, the current carrier configuration information including current carrier information for current all available carriers in the network.

2. The method of claim 1, wherein the current carrier configuration information comprises configuration information of at least one carrier group globally applied to the network.

3. The method of claim 1, wherein the latest received value of the carrier configuration change count of the network is set 0 to indicate that the mobile station did not receive carrier configuration information previously.

4. The method of claim 1, further comprising:
after receiving the global carrier configuration (AAI-Global-CFG) message, receiving, by the mobile station from the base station, a fourth message including information related to carriers supported by the base station;
transmitting, by the mobile station to the base station, a fifth message including information related to carriers supported by the mobile station; and
receiving, by the mobile station from the base station, a sixth message including information related to carriers assigned for the mobile station.

5. The method of claim 4, wherein the fourth message comprises a multi-carrier advertisement (AAI-MC-ADV) message, the fifth message comprises a multi-carrier request (AAI-MC-REQ) message and the sixth message comprises a multi-carrier response (AAI-MC-RSP) message.

6. The method of claim 1, wherein a polling bit in a MAC control extender header (MCEH) of the third message is set to 1.

7. A method of transmitting carrier configuration information to a mobile station by a base station in a network supporting Multi-carrier, the method comprising:
receiving, by the base station from the mobile station, a first message, the first message being a registration request (AAI-REG-REQ) message including a latest received value of a carrier configuration change count of the network, the value of the carrier configuration change count being a value which is changed according to a change of carrier information for all available carriers in the network;
transmitting, by the base station to the mobile station, a second message in response to the first message, the second message being a registration response (AAI-REG-RSP) message including current value of the carrier configuration change count of the network;
checking, by the base station, whether the latest received value of the carrier configuration change count of the network is valid or not based on a comparison between the latest received value of the carrier configuration change count and the current value of the carrier configuration change count; and
when the latest received value of the carrier configuration change count of the network is invalid, transmitting, by the base station to the mobile station, a third message, the third message being a global carrier configuration (AAI-Global-CFG) message including current carrier configuration information, the current carrier configuration information including current carrier information for current all available carriers in the network.

8. The method of claim 7, wherein the current carrier configuration information comprises configuration information of at least one carrier group globally applied to the network.

9. The method of claim 7, wherein the latest received value of the carrier configuration of the network is set to 0 to indicate that the mobile station did not receive carrier configuration information previously.

10. The method of claim 7, further comprising:
after transmitting the global carrier configuration (AAI-Global-CFG) message, transmitting, by the base station to the mobile station, a fourth message including information related to carriers supported by the base station;
receiving, by the base station from the mobile station, a fifth message including information related to carriers supported by the mobile station; and
transmitting, by the base station to the mobile station, a sixth message including information related to carriers assigned for the mobile station.

11. The method of claim 10, wherein the fourth message comprises a multi-carrier advertisement (AAI-MC-ADV) message, the fifth message comprises a multi-carrier request (AAI-MC-REQ) message and the sixth message comprises a multi-carrier response (AAI-MC-RSP) message.

12. A mobile station configured to receive carrier configuration information in a network supporting Multi-carrier, the mobile station comprising:
a processor; and
an RF (radio frequency) module configured to transceiver radio signals externally under a control of the processor,
wherein the processor is configured to:
transmit, to a base station, a first message, the first message being a registration request (AAI-REG-REQ) message including a latest received value of a carrier configuration change count of the network, the value of the carrier configuration change count being a value which is changed according to a change of carrier information for all available carriers in the network,
receive, from the base station, a second message in response to the first message, the second message being a registration response (AAI-REG-RSP) message including a current value of the carrier configuration change count of the network, and
when the latest received value of the carrier configuration change count is invalid based on a comparison between the latest received value of a carrier configuration change count and the current value of the carrier configuration count by the base station, receive, from the base station, a third message, the third message being a global carrier configuration (AAI-Global-CFG) message including current carrier configuration information the current carrier configuration information including current carrier information for current all available carriers in the network.

13. The mobile station of claim 12, wherein the current carrier configuration information comprises configuration information of at least one carrier group globally applied to the network.

14. The mobile station of claim 12, wherein the latest received value of the carrier configuration change count of the network is set to 0 to indicate that the mobile station did not receive carrier configuration information previously.

15. The mobile station of claim 12, wherein the processor is further configured to:

after receiving the global carrier configuration (AAI-Global-CFG) message, receive, from the base station, a fourth message including information related to carriers supported by the base station;
transmit, to the base station, a fifth message including information related to carriers supported by the mobile station; and
receive, from the base station, a sixth message including information related to carriers assigned for the mobile station.

16. The mobile station of claim 15, wherein the fourth message comprises a multi-carrier advertisement (AAI-MC-ADV) message, the fifth message comprises a multi-carrier request (AAI-MC-REQ) message and the sixth message comprises a multi-carrier response (AAI-MC-RSP) message.

17. A base station of transmitting carrier configuration information in a network supporting Multi-carrier, the base station comprising:
a processor; and
an RF (radio frequency) module configured to transceive radio signals externally under a control of the processor,
wherein the processor is configured to:
receive, from the mobile station, a first message, the first message being a registration request (AAI-REG-REQ) message including a latest received value of a carrier configuration change count of the network, the value of the carrier configuration change count being a value which is changed according to a change of carrier information for all available carriers in the network,
transmit, to the mobile station, a second message in response to the first message, the second message being a registration request (AAI-REG-REQ) message including a current value of the carrier configuration change count of the network,
check whether the latest received value of the carrier configuration change count of the network is valid or not based on a comparison between the latest received value of the carrier configuration change count and the current value of the carrier configuration change count, and
when the latest received value of the carrier configuration change count of the network is invalid, transmit, to the mobile station, a third message, the third message being a global carrier configuration (AAI-Global-CFG) message including current carrier configuration information, the current carrier configuration information including current carrier information for current all available carriers in the network.

18. The base station of claim 17, wherein the latest received value of the carrier configuration of the network is set to 0 to indicate that the mobile station did not receive carrier configuration information previously.

19. The base station of claim 17, wherein a polling bit in a MAC control extender header (MCEH) of the third message is set to 1.

20. The base station of claim 17, wherein the processor is further configured to:
after transmitting the global carrier configuration (AAI-Global-CFG) message, transmit, to the mobile station, a fourth message including information related to carriers supported by the base station;
receive, from the mobile station, a fifth message including information related to carriers supported by the mobile station, and transmit, to the mobile station, a sixth message including information related to carriers assigned for the mobile station.

21. The base station of claim 20, wherein the fourth message comprises a multi-carrier advertisement (AAI-MC-ADV) message, the fifth message comprises a multi-carrier request (AAI-MC-REQ) message and the sixth message comprises a multi-carrier response (AAI-MC-RSP) message.

* * * * *